US006673857B1

(12) United States Patent
Knoll et al.

(10) Patent No.: US 6,673,857 B1
(45) Date of Patent: Jan. 6, 2004

(54) THERMOPLASTIC ELASTOMER COMPOSITIONS

(75) Inventors: Konrad Knoll, Ludwigshafen (DE); Richard Rebizak, Ludwigshafen (DE); Rainer Anderlik, Heidelberg (DE); Sabine Philipp, Mörfelden-Walldorf (DE); Josef Wünsch, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/959,395

(22) PCT Filed: Apr. 27, 2000

(86) PCT No.: PCT/EP00/03815

§ 371 (c)(1),
(2), (4) Date: Oct. 24, 2001

(87) PCT Pub. No.: WO00/66662

PCT Pub. Date: Nov. 9, 2000

(30) Foreign Application Priority Data

May 3, 1999 (DE) .......................................... 199 20 257

(51) Int. Cl.$^7$ ................................................. C08L 5/10
(52) U.S. Cl. ........................ 524/315; 524/313; 524/318; 524/474; 524/848; 525/88; 525/232; 525/240
(58) Field of Search .................................. 524/313, 318, 524/848; 525/232, 240

(56) References Cited

U.S. PATENT DOCUMENTS

| 4,163,764 | A | * | 8/1979 | Nash .............................. 525/2 |
| 4,236,715 | A | * | 12/1980 | Middlebrook .............. 273/95 R |
| 5,750,607 | A | * | 5/1998 | Gerard et al. ................ 524/271 |
| 6,365,558 | B2 | * | 4/2002 | Lal ............................. 508/491 |

FOREIGN PATENT DOCUMENTS

| EP | 0 733 677 A1 | * | 9/1996 | ............ C08L/53/02 |
| EP | 0 747 466 A1 | * | 12/1996 | ......... C10M/169/04 |
| EP | 0 770 645 A2 | * | 5/1997 | ............ C08L/53/02 |
| WO | WO 96/20248 A1 | * | 7/1996 | ............ C08L/53/02 |

* cited by examiner

*Primary Examiner*—David W. Wu
*Assistant Examiner*—Rip A. Lee
(74) *Attorney, Agent, or Firm*—Keil & Weinkauf

(57) ABSTRACT

A thermoplastic elastomer composition comprises
a) from 5 to 99% by weight of a block copolymer which is composed of hard blocks S made from vinyl aromatic monomers and of one or more random soft blocks B/S made from dienes and from vinyl aromatic monomers,
b) from 1 to 95% by weight of a plasticizer with a higher polarity than white oil and with a lower polarity than diisooctyl phthalate,
c) from 0 to 50% by weight of a polyolefin, and
d) from 0 to 60% by weight of additives,
where the total of a) to d) is 100% by weight. The use of the molding compositions to produce flexible or elastic moldings is described, as are the resultant moldings.

12 Claims, No Drawings

THERMOPLASTIC ELASTOMER COMPOSITIONS

The invention relates to a thermoplastic elastomer composition, comprising
- a) from 5 to 99% by weight of a block copolymer which is composed of hard blocks S made from vinyl aromatic monomers and of one or more random soft blocks B/S made from dienes and from vinyl aromatic monomers,
- b) from 1 to 95% by weight of a plasticizer with a higher polarity than white oil and with a lower polarity than dioctyl phthalate,
- c) from 0 to 50% by weight of a polyolefin, and
- d) from 0 to 60% by weight of additives, where the total of a) to d) is 100% by weight.

The invention further relates to the use of the molding compositions for producing flexible or elastic moldings, and also to the resultant moldings.

Thermoplastic elastomer compositions based on hydrogenated or nonhydrogenated styrene-butadiene or styrene isoprene block copolymers (S-TPE) and, if desired, on polyolefins are known (e.g.: EP-A 0 583 228, EP-A 0 623 651, EP A 0 712 892 or EP-A 0 845 498). The physical properties, such as elasticity, hardness, tensile strength or adhesion, can be adjusted over a wide range via the selection of the auxiliaries and via the mixing ratios. The plasticizers used usually comprise low-aromatic paraffinic oils, naphthenic oils or oligomeric polybutadienes.

Thermoplastc elastomers or elastomer compositions based on block copolymers made from styrene and butadiene, with one or more random soft blocks B/S, are known from WO 95/35335 and WO 96/20248. Compared with thermoplastic elastomers with a soft phase made from a pure butadiene block, they have better processability, better weathering resistance, better thermal melt stability and better printability and paintability, e.g. with surface coatings.

The relatively high polarity of the soft blocks B/S means that these block copolymers have only limited compatibility with white oil, which is usually used as plasticizer for traditional S-TPEs.

It is an object of the present invention to provide a thermoplastic elastomer composition which does not have the abovementioned disadvantages and which, in particular when use is made of block copolymers with random soft blocks B/S, can be adjusted to any desired hardness without bleed-out of the plasticizer.

We have found that this object is achieved by means of the abovementioned thermoplastic elastomer composition.

The thermoplastic elastomer composition comprises from 5 to 99% by weight, preferably from 49 to 94% by weight, of a block copolymer which is composed of hard blocks S made from vinyl aromatic monomers and of one or more random soft blocks B/S made from dienes and from vinyl aromatic monomers.

Suitable vinyl aromatic monomers for the hard blocks S and also for the random soft blocks B/S are styrene, α-methyl styrene, vinyl toluene or mixtures of these.

The dienes used may comprise butadiene, isoprene, piperylene, 1-phenylbutadiene or mixtures of these.

Particular preference is given to block copolymers made from styrene and butadiene.

The preparation and properties of block polymers of this type are described, for example, in WO 95/35335 or WO 97/40079. They can be obtained by anionic polymerisation in a nonpolar solvent with addition of a polar cosolvent or of a potassium salt.

The morphology which results from the incompatibility of the blocks S and B/S is important in determining the suitability of the block copolymers as thermoplastic elastomers. The blocks B/S aggregate in the soft phase which forms the continuous matrix and are responsible for the elastomeric behavior at the service temperature. The blocks S are predominantly in the form of isolated, mostly bead-shaped, inclusions, which act as physical crosslinking points.

Symmetrical three-block copolymers and star-block copolymers with outer blocks S and with one or more blocks B/S lying therebetween are particularly suitable as thermoplastic elastomers.

The block copolymer preferably has a diene content of less than 50% by weight, preferably from 15 to 50% by weight, particularly preferably from 25 to 40% by weight, based on the entire block copolymer.

The proportion of the soft phase formed from the blocks B/S is generally at least 60% by weight, preferably from 60 to 80% by weight, particularly preferably from 65 to 75% by weight, based on the entire block copolymer. The blocks S formed from the vinyl aromatic monomers form the hard phase, the proportion of which is not more than 40% by weight, preferably from 20 to 40% by weight, particularly preferably from 25 to 35% by weight.

The random structure of the soft blocks B/S means that the glass transition temperature is generally from −50 to +25° C., preferably from −50 to +5° C., particularly preferably from −50 to −15° C. The glass transition temperature of the hard block S is preferably above 25° C., particularly preferably above 50° C.

The soft block B/S is preferably composed of from 30 to 75% by weight, particularly preferably from 30 to 65% by weight, of vinyl aromatic monomer, and from 25 to 70% by weight of diene, particularly preferably from 35 to 70% by weight. The soft block B/S may have been subdivided into two or more random soft blocks with different molecular weights or different monomer compositions.

The molar masses of soft block B/S is usually from 2,000 to 250,000, preferably from 20,000 to 150,000, particularly preferably from 60,000 to 120,000 [g/mol].

The molar mass of a block S is generally from 1,000 to 200,000, preferably from 5,000 to 50,000, particularly preferably from 15,000 to 25,000 [g/mol]. The block copolymer may be composed of blocks S with identical or different molar masses.

The block copolymers are usually mixed with stabilisers. Examples of suitable stabilizers are stearically hindered phenols such as Irganox® 1076 or Irganox® 3052 from Ciba-Geigy, Basle or α-tocopherol (Vitamin E).

The thermoplastic elastomer composition also comprises from 1 to 95% by weight, preferably from 4 to 49% by weight, of a plasticizer with a higher polarity than white oil and with a lower polarity than diisooctylphthalate. Particular preference is given to the use of plasticizers which are only slightly more polar than white oil. Examples of suitable plasticizers are substances which have polar groups, such as ester, amide, ether, and also an aliphatic radical having 12 to 18 carbon atoms. Examples of these are naturally occurring or synthetic esters of fatty acids, amides of fatty acids or esters of fatty alcohols. Preferred esters of fatty alcohols are those of citric acid, adipic acid or other di- or oligocarboxylic acids. The plasticizers mentioned may be used individually or in mixtures. It is also possible to use mixtures with paraffinic or naphthenic oils. The best mechanical properties are obtained by using a mixture of a plasticizers with white oil, where the amount of white oil used is just that required to avoid any separation out from the block copolymer.

Reference is given to the use of plasticizers comprising vegetable oils, such as sunflower oil, or comprising a mixture of vegetable oils and white oil.

The hardness and flowability of the thermoplastic elastomer composition may be varied over a white range via the amount of the plasticizer used.

The thermoplastic elastomer composition may comprise from 0 to 50% by weight, preferably from 1 to 30% by weight, of polyolefins, such as polyethylene, polypropylene, polybutylene, polyisobutylene, ethylene-propylene rubbers, or also EPDM rubbers. Preference is given to the use of metallocene polyethylene with a narrow molecular weight distribution and polyolefins with a high crystalline melting point, such as polypropylene. Soft polyolefins may be used to improve resistance to certain media, for example oils and solvent, and also to improve the tear propagation resistance of the elastomer composition, and crystalline polyolefins may be used to improve heat resistance and compression set.

Other components which may be present in the elastomer composition are additives of any type, usually in amounts of from 0 to 60% by weight, preferably from 1 to 40% by weight, based on the elastomer composition. Examples of possible additives are fibrous or pulverulent fillers, fibrous or pulverulent reinforcing materials, stabilisers, flame retardants, pigments, dyes, and processing aids, such as lubricants and mold-release agents. Preference is given to the use of inorganic fillers, such as talc, carbonates, sulfates, oxides of varying hydration levels, in particular titanium dioxide, Ca silicates, Mg silicates, silicates such as Aerosil, silica gel or kieselguhr, or carbon black. Substantially transparent mixtures can be obtained by adding nanocomposites. These are phyllosilicates, such as montmorillonite, which have preferably been impregnated with hydrophobicizers, such as amines or salts with quaternized amines.

The novel molding compositions may be obtained by mixing and homogenizing the components by the usual methods of plastics technology, and the sequence of adding the components may be varied. Examples of suitable mixing equipment are continuous or batch kneaders, Banbury mixers, or co-rotating or counter rotating single- or twin-screw extruders.

The novel elastomer composition is elastic, can be processed as a thermoplastic, and can readily be recycled by remelting. The novel elastomer composition is recommended for two-component (2C) injection molding, since it has excellent processability and compatibility with thermoplastics based on styrene, such as glass-clear polystyrene (GPPS), impact-modified polystyrene (HIPS), styrene-butadiene block copolymers, such as Styrolux® from BASF Aktiengesellschaft or K-Resins® (Phillips), and styrene-acrylonitrile polymers (SAN) and acrylonitrile, and with butadiene styrene polymers (ABS) polyphenylene ethers. The interface between the hard component and the novel elastomer composition as soft component is, furthermore, transparent. Using 2C injection molding in this way it is possible to produce flexible and rigid parts in a single casting. Other possible hard components are polyesters and polycarbonate.

The novel elastomer composition may readily be painted or printed, even without corona treatment. It is therefore suitable for producing elastic or flexible moldings, such as toys, parts for toys, "soft-touch" applications, such as grips or antislip surfaces, gaskets, switches, housings with sealing lips, control knobs, flexographic printing plates, shoe soles, hoses, profiles, medical items, such as infusion kits, dialysis units and breathing masks, hygiene items, such as toothbrushes, materials for insulating or sheathing cables, sound-deadening elements, folding bellows, rolls or roll coatings, and carpet backings.

EXAMPLES

A symmetrical S-B/S-S -three-block copolymer is prepared in a manner similar to that of the examples in WO 97/40079, except that in each case 1638 g of styrene were used for the terminal blocks S and a mixture of 3750 g of styrene and 3378 g of butadiene for the random soft block B/S. The polymerisation was initiated using 87.3 mmol of sec-butyllithium in the presence of 2.36 mmol of potassium-3,7-dimethyl-3-octanoate. The block copolymer had a number-average molar mass $M_n$, determined by GBC against a polystyrene standard, of 136,000 g/mol and a weight-average molar mass $M_W$ of 163,000 g/mol.

The symmetrical S-B/S-S - three-block copolymer can absorb up to 10% by weight of white oil. The total oil content can be raised to over 50% by weight by adding sunflower oil. Table 1 gives the stability limit.

TABLE 1

Stability limit for the proportion of white oil in different total proportions of oil in the thermoplastic elastomer composition

| Total oil content [% by weight] based on the elastomer composition | 10 | 20 | 30 | 40 | 50 |
|---|---|---|---|---|---|
| Stability limit at proportion [%] of white oil | 100 | 62 | 42 | 39 | 32 |

The block copolymer was mixed in a ZSK 25/2 twin-screw extruder at 180° C. with a premixed white oil/sunflower oil mixture (40/60). Table 2 gives the total proportion of oil and the properties of the resultant thermoplastic elastomer composition.

The DSC measurements confirm that the soft phase is plasticized selectively by the oil mixture. The glass transition temperature of the soft phase Tg (soft) is lowered from about −40° C. to about −80° C., while the glass transition temperature of the hard phase Tg (hard) is practically unaffected at about 60° C.

The Shore A hardness reduces practically linearly with rising oil content. Even at a Shore A hardness in the region of 10, the mechanical properties are still at an acceptable level. The elongation at break reaches a maximum of 1200% at 40% by weight total oil content.

TABLE 2

Properties of the thermoplastic elastomer composition as a function of total oil content in the form of a white oil/sunflower oil mixture (40/60).

| Total oil content [% by weight] | 0 | 5 | 10 | 20 | 30 | 40 | 50 |
|---|---|---|---|---|---|---|---|
| Glass transition temperature of soft phase Tg [° C.] | −38 | −43 | −48 | −60 | −65 | −72 | −78 |

TABLE 2-continued

Properties of the thermoplastic elastomer composition
as a function of total oil content in the form of a
white oil/sunflower oil mixture (40/60).

| | | | | | | | |
|---|---|---|---|---|---|---|---|
| Shore hardness A | 82 | 68 | 63 | 47 | 30 | 16 | 11 |
| Tear resistance [N/mm$^2$] | 27 | 24 | 23 | 19 | 12 | 5 | 3 |
| Elongation at break [%] | 600 | 700 | 800 | 980 | 1150 | 1200 | 1100 |

Adding the oil can significantly improve the melt flowability MFR (Table 3). It is even possible, therefore, to achieve flowabilities which permit injection molding at low temperatures and with short demolding times.

TABLE 3

Melt flowability MFR [5 kp, 10 min$^{-1}$] of elastomer
compositions as a function of total oil content
(white oil/sunflower oil 30/70) and of temperature

| Total oil content [% by weight] | 0 | 5 | 10 | 20 | 30 | 4G | 50 |
|---|---|---|---|---|---|---|---|
| 100° C. | | | | | 2.4 | 9.5 | 30 |
| 110° C. | | | | 1.4 | 6.0 | 21.6 | 79 |
| 120° C. | | | | 3.3 | 10.0 | 43.0 | |
| 130° C. | | | 1.6 | 6.0 | 20.1 | 87.8 | |
| 140° C. | | | 3.7 | 11.6 | 36.3 | 136 | |
| 150° C. | | 3.5 | 6.9 | 18.4 | 59.3 | | |
| 160° C. | 2.9 | 6.3 | 11.3 | 31.5 | 99.6 | | |
| 170° C. | 5.2 | 9.7 | 18.9 | 44.0 | | | |
| 180° C. | 9.0 | 16.9 | 27.8 | 68.7 | | | |

We claim:

1. A thermoplastic elastomer composition, comprising
   a) from 5 to 99% by weight of a block copolymer which is composed of hard blocks S made from vinyl aromatic monomers and of one or more random soft blocks B/S composed of from 25 to 70% by weight of dienes and 30 to 75% by weight of vinylaromatic monomers,
   b) from 1 to 95% by weight of a plasticizer with a higher polarity than white oil and with a lower polarity than diisooctyl phthalate, and which contains an ester group, amide group, or ether group, and which contains an aliphatic radical having from 12 to 18 carbon atoms, or comprises a mixture of these with paraffinic or naphthenic oils,
   c) from 0 to 50% by weight of a polyolefin, and
   d) from 0 to 60% by weight of additives,
   where the total of a) to d) is 100% by weight.

2. A thermoplastic elastomer composition as claimed in claim 1, which comprises
   a) from 49 to 94% by weight of the block copolymer,
   b) from 4 to 49% by weight of the plasticizer,
   c) from 1 to 30% by weight of the polyolefin, and
   d) from 1 to 40% by weight of additives.

3. A thermoplastic elastomer composition as claimed in claim 1, in which the block copolymer comprises a symmetrical three-block copolymer or a star-block copolymer with outer blocks S and with one or more blocks B/S lying therebetween.

4. A thermoplastic elastomer composition as claimed in claim 1, wherein the block copolymer has a diene content of less than 50% by weight and has a proportion of at least 60% by weight of the soft phase formed from the blocks B/S, based in each case on the entire block copolymer.

5. A thermoplastic elastomer composition as claimed in claim 1, in which the plasticizer comprises an ester of a fatty acid, an amide of a fatty acid, or an ester of a fatty alcohol, or mixtures of these with paraffinic or naphthenic oils.

6. A thermoplastic elastomer composition as claimed in claim 1, in which the plasticizer comprises vegetable oil or a mixture of vegetable oil and white oil.

7. A thermoplastic elastomer compositions as claimed in claim 1, in which the polyolefin comprises polyethylene, polypropylene, polybutylene or polyisobutylene.

8. A process for preparing elastic and flexible moldings, which comprises using a thermoplastic elastomer composition as claimed in claim 1.

9. A process for producing moldings with rigid and flexible regions, which comprises using a thermoplastic elastomer composition as claimed in claim 1 as flexible component and an impact-modified or unmodified styrene homo- or copolymer, a polyester, or polycarbonate, as rigid component, in two-component injection molding.

10. A molding with rigid and flexible regions, obtained by a process for producing moldings with rigid and flexible regions, which comprises using a thermoplastic elastomer composition comprising
    a) from 5 to 99% by weight of a block copolymer which is composed of hard blocks S made from vinyl aromatic monomers and of one or more random soft blocks B/S composed of from 25 to 70% by weight of dienes and 30 to 75% by weight of vinylaromatic monomers,
    b) from 1 to 95% by weight of a plasticizer with a higher polarity than white oil and with a lower polarity than diisooctyl phthalate, and which contains an ester group, amide group, or ether group, and which contains an aliphatic radical having from 12 to 18 carbon atoms, or comprises a mixture of these with paraffinic or naphthenic oils,
    c) from 0 to 50% by weight of a polyolefin, and
    d) from 0 to 60% by weight of additives,
       where the total of a) to d) is 100% by weight as flexible component and an impact-modified or unmodified styrene homo- or copolymer, a polyester, or polycarbonate, as rigid component, in two-component injection molding.

11. An elastic or flexible molding, obtained by a process for preparing elastic and flexible moldings, which comprises using a thermoplastic elastomer composition comprising
    a) from 5 to 99% by weight of a block copolymer which is composed of hard blocks S made from vinyl aromatic monomers and of one or more random soft blocks B/S composed of from 25 to 70% by weight of dienes and 30 to 75% by weight of vinylaromatic monomers,
    b) from 1 to 95% by weight of a plasticizer with a higher polarity than white oil and with a lower polarity than diisooctyl phthalate, and which contains an ester group, amide group, or ether group, and which contains an aliphatic radical having from 12 to 18 carbon atoms, or comprises a mixture of these with paraffinic or naphthenic oils, c) from 0 to 50% by weight of a polyolefin, and d) from 0 to 60% by weight of additives, where the total of a) to d) is 100% by weight.

12. A toy, a part of a toy, a grip, a control knob, an antislip surfaces, a gasket, a switch, a housing with sealing lips, a flexographic printing plate, a shoe sole, a hose, a profile, a medical item, such as an infusion kit, a breathing mask or a dialysis unit, a housing for an electrical device, a sanitary item, a toothbrush, an insulating or sheathing material for a cable, a sound-deadening element, a folding bellows, a roll, a roller or a carpet backing obtained from the process as claimed in claim 8.

* * * * *